(12) United States Patent
Hong

(10) Patent No.: US 12,271,453 B2
(45) Date of Patent: Apr. 8, 2025

(54) AUGMENTED HANDWRITTEN SIGNATURE AUTHENTICATION METHOD AND ELECTRONIC DEVICE SUPPORTING SAME

(71) Applicant: SECUVE CO., LTD., Seoul (KR)

(72) Inventor: Ki-Yoong Hong, Seoul (KR)

(73) Assignee: SECUVE CO., LTD., Seoul (KR)

( * ) Notice: Subject to any disclaimer, the term of this patent is extended or adjusted under 35 U.S.C. 154(b) by 362 days.

(21) Appl. No.: 17/269,934

(22) PCT Filed: Dec. 30, 2020

(86) PCT No.: PCT/KR2020/019401
§ 371 (c)(1),
(2) Date: Jul. 21, 2022

(87) PCT Pub. No.: WO2021/137620
PCT Pub. Date: Jul. 8, 2021

(65) Prior Publication Data
US 2022/0366726 A1    Nov. 17, 2022

(30) Foreign Application Priority Data

Dec. 31, 2019    (KR) .......................... 10-2019-0179597

(51) Int. Cl.
*G06V 40/30*    (2022.01)
*G06F 3/0482*    (2013.01)
*G06F 3/04883*    (2022.01)
*G06F 21/32*    (2013.01)

(52) U.S. Cl.
CPC ............ *G06F 21/32* (2013.01); *G06F 3/0482* (2013.01); *G06F 3/04883* (2013.01); *G06V 40/376* (2022.01); *G06V 40/394* (2022.01)

(58) Field of Classification Search
CPC .... G06F 21/32; G06F 3/0482; G06F 3/04883; G06V 40/394; G06V 40/376
See application file for complete search history.

(56) References Cited

U.S. PATENT DOCUMENTS

2016/0259502 A1* 9/2016 Parrott ..................... H04W 4/12
2018/0018657 A1* 1/2018 Sawant .................. G06Q 20/36

FOREIGN PATENT DOCUMENTS

GB            2511813 A  *  9/2014  ............... H04N 1/32

* cited by examiner

*Primary Examiner* — David F Dunphy
(74) *Attorney, Agent, or Firm* — Studebaker Brackett PLLC

(57) ABSTRACT

Provided are an augmented handwritten signature authentication method and an electronic device supporting the same, the method including: receiving a primary touch input corresponding to a primary handwritten signature input of a user; receiving, after the primary handwritten signature input is received and a specified time period elapses, a secondary mark input of the user; obtaining primary touch position data corresponding to the primary touch input, and the secondary mark input; and performing user authentication by comparing the primary touch position data corresponding to the primary touch input and secondary touch position data related to at least part of the secondary mark input with prestored primary touch registration data and secondary touch registration data, respectively.

6 Claims, 8 Drawing Sheets

AUGMENTED HANDWRITTEN SIGNATURE AUTHENTICATION METHOD AND ELECTRONIC DEVICE SUPPORTING SAME

CROSS-REFERENCE TO RELATED APPLICATIONS

This application is the U.S. National Stage of International Application No. PCT/KR2020/019401 filed Dec. 30, 2020, which claims benefit of priority to Korean Patent Application No. 10-2019-0179597 filed Dec. 31, 2019, the entire content of which is incorporated herein by reference.

TECHNICAL FIELD

The present disclosure relates to an electronic signature. More particularly, the present disclosure relates to an augmented handwritten signature authentication method and an electronic device supporting the method, the method and the device being capable of providing higher security performance through an electronic signature by combining a handwritten signature with feature information so that it is difficult for others to recognize the combination.

BACKGROUND ART

Biometrics are a function of automatically identifying people according to physiological or behavioral characteristics. Various biometrics used to identify individuals may involve fingerprints, voice prints, retinal images, and DNA. Biometrics have many potential uses. For example, biometric identification may be used in place of a personal identification number (PIN) for use with automated teller machines.

However, conventional biometrics have a problem that the use is somewhat limited because there is a possibility that fingerprint information of a user might be reproduced, or because an error may occur according to a fingerprint input environment (for example, the environment in which a finger is wet or marked with foreign matter). Accordingly, recently, a user authentication method using an electronic signature has been proposed, and electronic signatures have become more important in various situations. For example, electronic signatures are commonly used instead of pen and paper to obtain confirmation of a credit card transaction from a credit card possessor. As electronic signatures have become more common, a function of checking the authenticity of electronic signatures has become more important.

Regarding conventional electronic signature matching, an elastic matching method for comparing one signature with another signature is used. The elastic matching method includes the operation of generating mapping between points corresponding to two signatures to be measured at different times after starting to write a signature. By minimizing the curvature of spatial distortion from the mapping of regional spatial distances of the measured points, the elastic matching method provides quantitative measurements of spatial correlation and non-uniform spatial distortion in the mapping, thereby indicating a similarity between signatures. However, the similarity of a signature does not provide the security of the signature, so that security of a conventional electronic signature is somewhat weak.

DISCLOSURE

Technical Problem

The present disclosure is directed to providing an augmented handwritten signature authentication method and an electronic device supporting the method, the method and the device being capable of providing higher security through signing by combining primary data corresponding to an electronic signature of a user and a plurality of pieces of secondary data so that it is difficult for others to recognize the combination.

Technical Solution

According to an embodiment of the present disclosure, there is provided an augmented handwritten signature authentication method including: receiving a primary touch input corresponding to a primary handwritten signature input of a user; receiving, after the primary handwritten signature input is received and a specified time period elapses, a secondary mark input of the user; obtaining primary touch position data corresponding to the primary touch input, and the secondary mark input; and performing user authentication by comparing the primary touch position data corresponding to the primary touch input and secondary touch position data related to at least part of the secondary mark input with prestored primary touch registration data and secondary touch registration data, respectively.

Herein, the augmented handwritten signature authentication method may further include: performing comparison to determine whether the secondary touch position data overlaps with part of the primary touch position data; and determining the secondary touch position data as valid data when at least part of the secondary touch position data overlaps with the at least part of the primary touch position data, or determining the secondary touch position data as invalid data when the at least part of the secondary touch position data does not overlap with the at least part of the primary touch position data.

In the meantime, the obtaining of the secondary mark input may include: receiving a touch input to an area other than a position of the primary handwritten signature input; displaying a plurality of emoticons and emojis on a screen; receiving a user input of selecting one of the emoticons and emojis; and determining the selected emoticon or emoji as the secondary mark input.

At the determining as the secondary mark input, the determined secondary mark may be output to the screen, being not shown on the screen and being hidden.

According to an embodiment of the present disclosure, there is provided an augmented handwritten signature authentication method including: a data acquisition unit configured to obtain a primary touch input corresponding to a primary handwritten signature input of a user, and obtain, after a specified time period elapses, a secondary mark input; and a signature authentication unit configured to obtain primary touch position data corresponding to the primary touch input, and the secondary mark input, and perform user authentication by comparing the primary touch position data corresponding to the primary touch input and secondary touch position data related to at least part of the secondary mark input with prestored primary touch registration data and secondary touch registration data, respectively.

Herein, the signature authentication unit may be configured to perform comparison to determine whether the secondary touch position data overlaps with part of the primary touch position data, and determine the secondary touch position data as valid data when at least part of the secondary touch position data overlaps with the at least part of the primary touch position data, or determine the secondary touch position data as invalid data when the at least part of the secondary touch position data does not overlap with the at least part of the primary touch position data.

In addition, the data acquisition unit may be configured to receive a touch input to an area other than a position of the primary handwritten signature input, display a plurality of emoticons and emojis on a screen, receive a user input of selecting one of the emoticons and emojis, and determine the selected emoticon or emoji as the secondary mark input.

The data acquisition unit may be configured to output the determined secondary mark to the screen, the determined secondary mark being not shown on the screen and being hidden.

Advantageous Effects

According to the augmented handwritten signature authentication method and the electronic device supporting the method according to the present disclosure, a user's individual pattern difficult to be reproduced or copied by others is added to a signature, thereby providing higher security performance.

In addition, various effects that the present disclosure may provide will be described together with the description of each figure.

BEST MODE

It is noted that only the parts necessary for understanding embodiments of the present disclosure will be described herein and a description of other parts will be omitted as long as the gist of the present disclosure is not disturbed.

The terms and words used in the present specification described below and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the disclosure. Therefore, configurations described in exemplary embodiments and the accompanying drawings of the present disclosure do not represent all of the technical spirits of the present disclosure, but are merely preferable embodiments. Therefore, it should be understood that various equivalents and modifications thereof could be made at the time of filing this application.

Hereinafter, an embodiment of the present disclosure will be described in detail with reference to the accompanying drawings.

Figure 1:
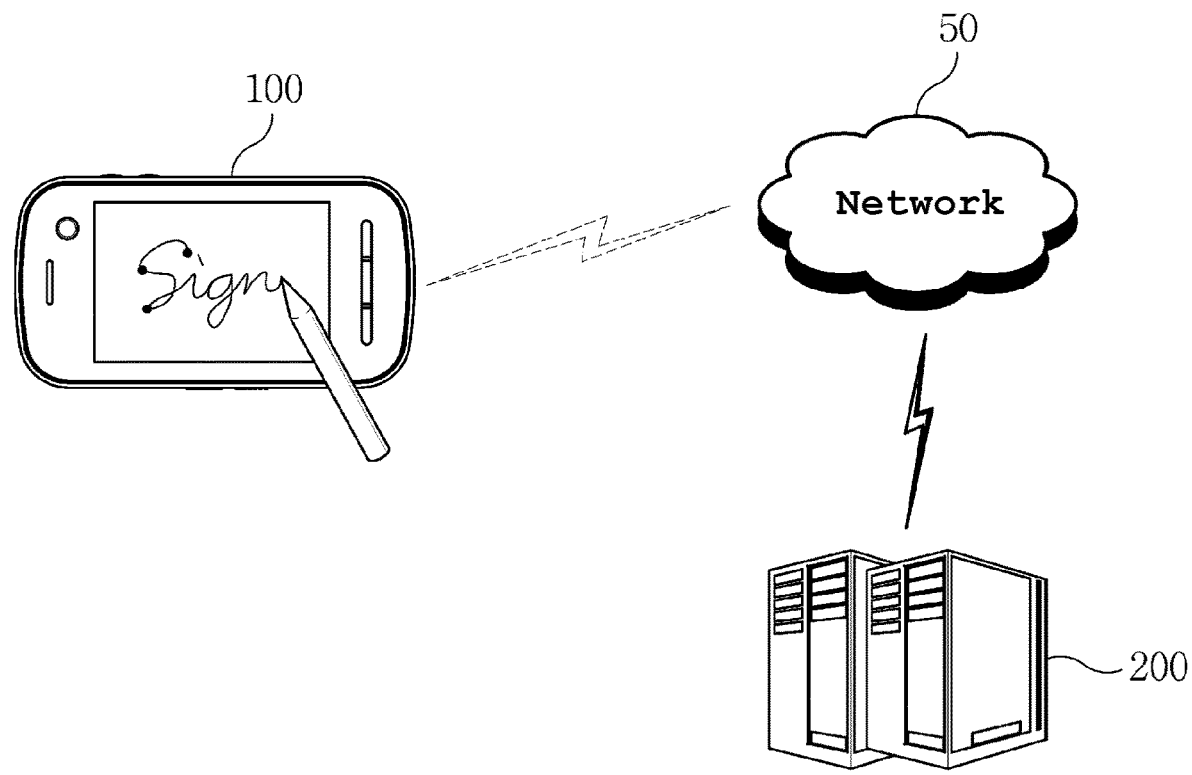
FIG. 1 is a diagram illustrating an example of an augmented handwritten signature authentication system according to an embodiment of the present disclosure.

FIG. 1 is a diagram illustrating an example of an augmented handwritten signature authentication system according to an embodiment of the present disclosure.

Referring to FIG. 1, the augmented handwritten signature authentication system 10 according to the embodiment of the present disclosure may include an electronic device 100, a network 50, and a server device 200.

The network 50 may include at least one communication element that may establish a communication channel between the electronic device 100 and the server device 200. For example, the network 50 may include at least one base station, a base station controller, a converter, and a core each supporting a communication generation, such as 3G, 4G, or 5G. In response to a request of the electronic device 100, the network 50 may establish a communication channel between the server device 200 and the electronic device 100.

The server device 200 may establish a communication channel to at least one electronic device 100 through the network 50. The server device 200 may provide a specified web page to the electronic device 100. In particular, the server device 200 may support a web service based on signature authentication of the electronic device 100. For example, the server device 200 may include at least one server capable of supporting a particular function on the basis of signature authentication, for example, a content server for providing at least one content, a shopping server for supporting purchase of at least one item online, a finance server for supporting finance-related services, or a stock server for supporting stock transactions.

When the electronic device 100 accesses the server device 200, the server device 200 provides different functions depending on whether signature authentication of the electronic device 100 succeeds or not. In this process, the server device 200 may compare touch input data provided by the electronic device 100 with prestored signature reference information, and may determine whether signature authentication succeeds or fails, according to a result of comparison. Regarding this, the server device 200 may perform a signature reference information registration process by the electronic device 100, and may store therein and manage the obtained signature reference information. The signature reference information may contain primary touch registration data, elapsed time information, and secondary touch registration data. Herein, the signature reference information may only contain the primary touch registration data and the secondary touch registration data. A position of the secondary touch registration data may overlap with at least one of positions of the primary touch registration data. Alternatively, the secondary touch registration data of the signature reference information may contain particular manipulation information in a signature input interface (or screen) of the electronic device 100.

The electronic device 100 may store at least one application program in a memory, and may support a particular user function on the basis of the application program. In particular, the electronic device 100 may support a function requiring security based on signature authentication, or may set the access to a particular user function such that the access is achieved through signature authentication. Examples of the above-described electronic device 100 may include various electronic devices such as smartphones, tablet PCs, slate PCs, desktop PCs, and pad-type electronic devices. In addition, the electronic device 100 may access the server device 200 over the network 50, and may use a particular service that the server device 200 provides. For example, the electronic device 100 may receive a particular web page that the server device 200 provides, and may output the particular web page. The web page may include a web page that provides various types of search information, news, and stock information. The web page may distinguish between users through user authentication. Regarding this, the electronic device 100 may provide password and ID information to the server device 200 according to a user input. In particular, the electronic device 100 may transmit touch input data related to signature authentication to the server device 200, and after authentication success, the electronic device 100 may use a user authentication version of a particular web page.

Regarding the use of the above-described signature authentication function, the electronic device 100 may register signature reference information in the server device 200 in advance, and later, may transmit touch input data corresponding to the signature reference information to the server device 200. The signature reference information that the electronic device 100 registers in the server device 200 may contain primary touch registration data, elapsed time information, and secondary touch registration data. At least some positions of the secondary touch registration data may overlap with at least some positions of the primary touch registration data.

Figure 2A:
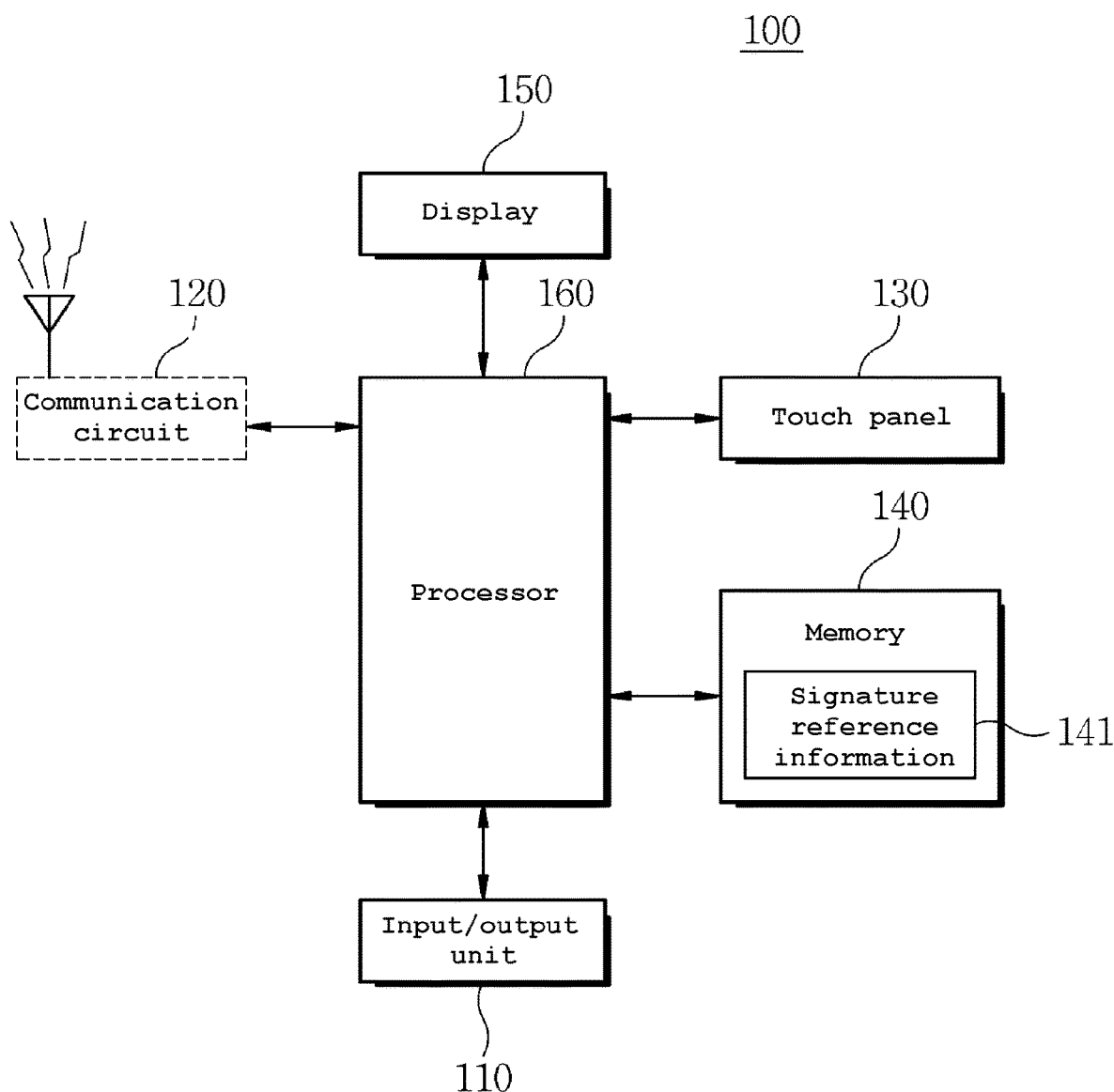
FIG. 2A is a diagram illustrating an example of a configuration of an electronic device for providing an augmented handwritten signature function according to an embodiment of the present disclosure.

FIG. 2A is a diagram illustrating an example of a configuration of an electronic device for providing an augmented handwritten signature function according to an embodiment of the present disclosure.

Referring to FIG. 2A, the electronic device 100 according to the embodiment of the present disclosure may include an Input/output unit 110, a communication circuit 120, a touch panel 130, a memory 140, a display 150, and a processor 160.

The Input/output unit 110 may include: an input part having a physical button related to supporting an input function of the electronic device 100, a microphone supporting a voice input, and a touch key; and an output part having a speaker, a lamp, and a vibration motor related to supporting an output function of the electronic device 100.

The communication circuit 120 may establish a communication channel related to a communication function of the electronic device 100. The communication circuit 120 may include a wired communication interface or a wireless communication interface or both. In addition, the communication circuit 120 may include a short-range wireless communication interface (e.g., Bluetooth, Zigbee, Wi-Fi, etc.) and a long-range wireless communication interface (e.g., a base station-based communication module). The communication circuit 120 may establish a communication channel to the server device 200 through the network 50 according to the execution of a particular user function, and may receive a web page from the server device 200 and output the same to the display 150 in response to the control by the processor 160. In addition, the communication circuit 120 may transmit, to the server device 200, signature reference information 141 related to signature registration and touch input data related to signature authentication. In the meantime, if the electronic device 100 does not support a function of accessing the server device 200, the communication circuit 120 may be omitted from the configuration of the electronic device 100.

The touch panel 130 may support a touch input function as an input function of the electronic device 100. The touch panel 130 may support, for example, at least one of various methods capable of detecting a user finger touch, such as a capacitance method, a resistance film method, and a pressure method. The touch panel 130 may be provided in the form of a touch screen together with the display 150. In addition, the touch panel 130 may be one type of the Input/output unit 110 as an input function. Regarding authentication, with respect to the touch panel 130, a stylus pen may be used. In addition, the touch panel 130 may include an electromagnetic induction panel to support an input function of a particular type of an electronic pen. The touch panel 130 may provide touch position data according to a user input (for example, a finger input or a pen input), to the processor 160.

The memory 140 may store therein at least one piece of data or at least one application program both related to authentication of the electronic device 100. For example, the memory 140 may include an operating system related to authentication of the electronic device 100, a gallery program, a document editing program, an e-mail program, a stock transaction program, and a finance transaction program that are executed on the basis of signature authentication. In addition, the memory 140 may store therein a signature authentication program and the signature reference information 141. The signature authentication program may be configured to be included in the execution of a particular application program or to be called and executed when signature authentication is required during execution of a particular application program. The signature authentication program may support registration of the signature reference information 141 and signature authentication based on the signature reference information 141. The memory 140 may include a non-secure memory and a secure memory. A program related to a signature and the signature reference information 141 both requiring security may be stored in the secure memory.

The display 150 may output at least one screen (or screen interface) related to authentication of the electronic device 100. The at least one screen may include, for example, a screen according to execution of a particular application program. In particular, the at least one screen may include a signature registration screen and a signature authentication screen that are related to signature authentication. The signature registration screen may include a signature registration screen related to use of a local function executed in the electronic device 100, or a signature registration screen related to use of a particular function provided by the server device 200, or both. The signature authentication screen may include a signature authentication screen related to use of a local function of the electronic device 100, or a signature authentication screen related to use of a function provided by the server device 200, or both.

The processor 160 may perform transmission and processing of at least one signal related to authentication of the electronic device 100. For example, the processor 160 may perform signal processing required for execution of a program, termination of a program, and linkage of a program. In particular, regarding signature authentication, the processor 160 may perform signal processing required for signature registration and signature authentication. Regarding this, the processor 160 may include the configuration as shown in FIG. 2B.

Figure 2B:
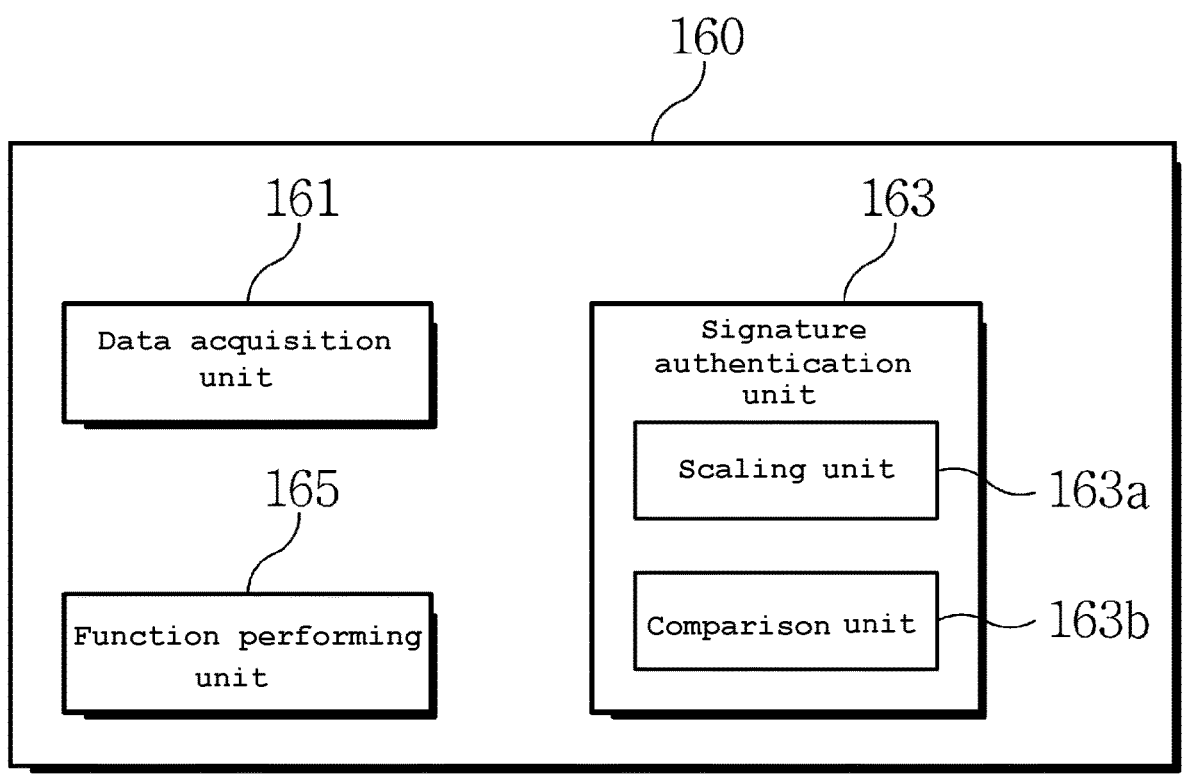
FIG. 2B is a diagram illustrating an example of a configuration of a processor of an electronic device according to an embodiment of the present disclosure.

FIG. 2B is a diagram illustrating an example of a configuration of a processor of an electronic device according to an embodiment of the present disclosure.

Referring to FIG. 2B, the processor 160 according to the embodiment of the present disclosure may include a data acquisition unit 161, a signature authentication unit 163, and a function performing unit 165. At least one of the data acquisition unit 161, the signature authentication unit 163, and the function performing unit 165 included in the processor 160 may be realized and executed by at least one hardware processor or software processor. In addition, the data acquisition unit 161 of the processor 160 may be realized or executed by a non-secure processor, and the signature authentication unit 163 may be realized or executed by a secure processor. The signature authentication unit 163 may be realized or executed by a non-secure processor or a secure processor or both according to the security of executed information. Alternatively, when necessary, the data acquisition unit 161 may be realized or executed by a secure processor.

The data acquisition unit 161 may obtain data related to signature authentication. For example, when a function related to signature registration is executed, the data acquisition unit 161 activates the touch panel 130 while outputting a screen for signature registration, to the display 150. When primary touch registration data is obtained through the touch panel 130, the data acquisition unit 161 requests an input of secondary touch registration data after a specified time period elapses. The data acquisition unit 161 may store touch input information as the signature reference information 141 in the memory 140 (e.g., a secure memory), wherein the touch input information contains the primary touch registration data, elapsed time information, and the secondary touch registration data by a user input. In this operation, the data acquisition unit 161 may adjusts an elapsed time period according to the user input.

When the secondary touch registration data is obtained, the data acquisition unit 161 determines whether the secondary touch registration data overlaps with touch positions of the primary touch registration data. When at least part of the secondary touch registration data does not overlap with the touch positions of the primary touch registration data, the data acquisition unit 161 outputs a report message about this and provides guidance such that the secondary touch registration data is input on the touch positions of the primary touch registration data. In addition, the data acquisition unit 161 may obtain, as the secondary touch registration data, manipulation information of a screen interface provided in relation to signature registration. The manipulation information may contain, for example, input information on selecting a particular item (or a particular object) prestored in the memory 140 of the electronic device 100 and placing the particular item in an area adjacent to the position at which the primary touch registration data is displayed, during signature registration.

The data acquisition unit 161 may output a screen related to signature authentication to the display 150 when a program related to signature authentication is executed or an event requesting signature authentication is executed. The data acquisition unit 161 may transmit, to the signature authentication unit 163, the touch input information input through the touch panel 130. Alternatively, the data acquisition unit 161 may transmit the obtained touch input information to the server device 200 when the signature authentication is performed on the basis of the server device 200. Herein, the data acquisition unit 161 may encrypts the obtained touch input information and may transmit a result of encryption to the server device 200. The touch input information may only contain primary touch input data and secondary touch input data according to setting. Alternatively, elapsed time information may be added in an additional/replaceable manner.

After a touch input occurs on the touch panel 130 in relation to the acquisition of the primary touch input data and a touch release event elapses for a specified time period, the data acquisition unit 161 determines that an input of the primary touch input data is completed. Similarly, after a touch input occurs on the touch panel 130 in relation to the acquisition of the secondary touch input data and a specified time period elapses, the data acquisition unit 161 determines that an input of the secondary touch input data is completed. Alternatively, similarly to the completion of input of the primary touch input data, after a touch release event occurs and a specified time period elapses, the data acquisition unit 161 determines than the operation of input of the secondary touch input data is completed.

Herein, the data acquisition unit 161 may output a determined secondary mark to a screen, but the determined secondary mark is not shown on the screen and is hidden. That is, the data acquisition unit 161 outputs the determined secondary mark, being not shown on the screen and being hidden. Therefore, others are prevented from stealing the secondary data and security efficiency is thus maximized.

The signature authentication unit 163 may compare the touch input information provided by the data acquisition unit 161 with the signature reference information 141 prestored in the memory 140. Regarding this, the signature authentication unit 163 may include a scaling unit 163a and a comparison unit 163b.

The scaling unit 163a may adjust the size of the touch input information. In this process, the scaling unit 163a may adjust the size of the touch input information such that the size of the touch input information is similar to the size of the signature reference information 141. When the size of the touch input information is similar to the size of the signature reference information 141, the touch input information is transmitted to the comparison unit 163b without scale adjustment.

The comparison unit 163b may compare the signature reference information 141 with the touch input information of which the scale is adjusted by the scaling unit 163a or with the touch input information similar to the signature reference information 141 in size. In the comparison process, the comparison unit 163b may compare the primary touch input data with the primary touch registration data on the basis of the elapsed time information contained in the touch input information, and may compare the elapsed time information with the elapsed time information contained in the signature reference information 141. In addition, the comparison unit 163b may compare the secondary touch input data with the secondary touch registration data. The comparison unit 163b may determine that signature authentication succeeds when the pieces of the information have similarities within a specified error ratio. When at least one of the primary touch input data, the elapsed time information, and the secondary touch input data does not have a similarity degree within a specified extent of similarity, the comparison unit 163b determines that signature authentication fails.

The function performing unit 165 may execute a specified user function when the signature authentication unit 163 has succeeded in signature authentication. For example, the function performing unit 165 may checks an application program that has requested signature authentication to be performed, and may execute the application program when signature authentication succeeds. Next, the function performing unit 165 may perform control to output the execution screen to the display 150. When signature authentication fails, the function performing unit 165 may perform control so as to output a report message related to failure of the execution of the application program.

As described above, the processor 160 of the electronic device 100 according to the embodiment of the present disclosure may include the data acquisition unit 161 and the signature authentication unit 163. The data acquisition unit 161 may be configured to receive the primary touch input data corresponding to a primary handwritten signature input of the user; obtain primary touch position data from the primary touch input data; receive the secondary touch input data corresponding to a secondary mark input (or secondary touch input) of the user after the primary touch input data is received and a predetermined time period elapses; and obtain secondary touch position data of the secondary touch input data. The signature authentication unit 163 may perform user authentication by comparing the primary touch position data and the secondary touch position data with the primary touch registration data and the secondary touch registration data which are pre-registered, respectively.

Further, the signature authentication unit 163 may perform comparison to determine whether the secondary touch position data overlaps with part of the primary touch position data. When the secondary touch position data overlaps with part of the primary touch position data, the signature authentication unit 163 determines the secondary touch position data as valid data. When the secondary touch position data does not overlap with part of the primary touch position data, the signature authentication unit 163 determines the secondary touch position data as invalid data.

In addition, after receiving the primary touch input data corresponding to the primary handwritten signature input, the data acquisition unit 161 may receive a touch input to an area other than the primary handwritten signature, may receive a user input of selecting one of a plurality of emoticons and emojis displayed on the screen, and may determine the selected emoticon or emoji as the secondary mark input.

Figure 3:
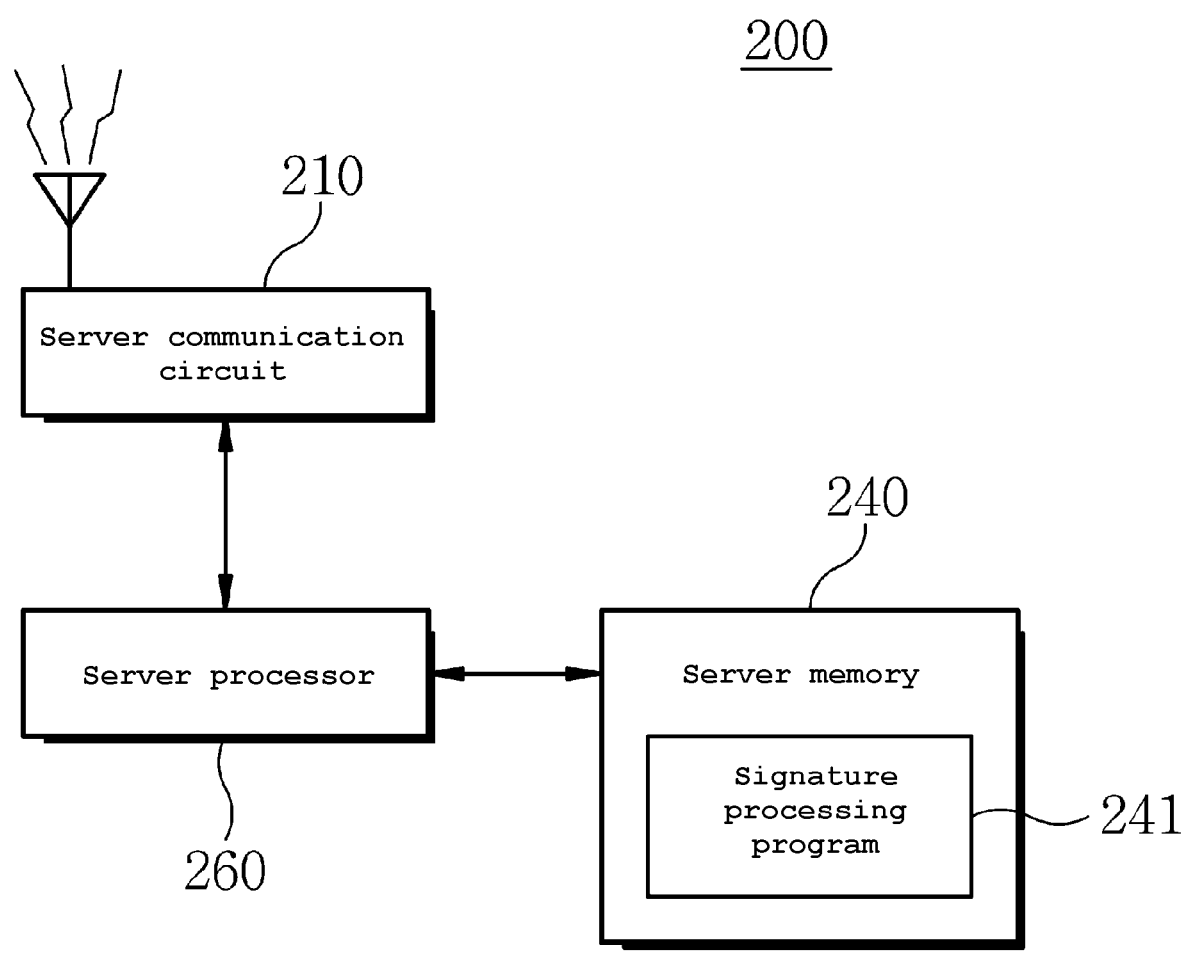
FIG. 3 is a diagram illustrating an example of a configuration of a server device according to an embodiment of the present disclosure.

FIG. 3 is a diagram illustrating an example of a configuration of a server device according to an embodiment of the present disclosure.

Referring to FIG. 3, the server device 200 according to the embodiment of the present disclosure may include a server communication circuit 210, a server memory 240, and a server processor 260.

The server communication circuit 210 may support a communication function of the server device 200. For example, the server communication circuit 210 may establish a communication channel with the electronic device 100 when access by the electronic device 100 is requested over the network 50, and may provide a specified web page to the electronic device 100 in response to the control by the server processor 260. When service support related to signature authentication is requested, the server communication circuit 210 receives, from the electronic device 100, touch input information required for signature authentication.

The server memory 240 may store therein at least one piece of data or at least one program both related to authentication of the server device 200. For example, the server memory 240 may store a signature processing program 241 therein. The signature processing program 241 may be activated when a program requiring signature authentication is requested to be executed after an electronic device 100 makes access. The signature processing program 241 may receive touch input information from the electronic device 100, and may compare the same with prestored signature reference information. To store the signature reference information, the signature processing program 241 may perform a procedure for registering the signature reference information when access by the electronic device 100 is given.

The server processor 260 may perform transmission and processing of at least one signal related to authentication of the server device 200. For example, the server processor 260 may provide a specified web page to the electronic device 100 when access by the electronic device 100 is given. In this operation, when signature authentication is required, the server processor 260 provides a screen for signature authentication to the electronic device 100 and compare the touch input information related to signature authentication received from the electronic device 100 with the signature reference information pre-stored in the server memory 240. When the user does not have signature reference information stored in the server memory 240, the server processor 260 provides a screen for registering signature reference information to the electronic device 100, and stores the touch registration information provided by the electronic device 100, as the signature reference information. The touch registration information may contain primary touch registration data, elapsed time information, and secondary touch registration data.

In relation to signature authentication, the server processor 260 may determine whether the touch input information received from the electronic device 100 is divided into the primary touch input data and the secondary touch input data on the basis of the elapsed time information. When the touch input information is divided, the server processor 260 performs a comparison operation. When the touch input information is not divided, the server processor 260 determines that signature authentication fails. The server processor 260 may compare the primary touch input data of the touch input information received from the electronic device 100 with the primary touch registration data contained in the signature reference information; may compare the lengths of the elapsed time periods; and may compare the secondary touch input data contained in the touch input information received from the electronic device 100 with the secondary touch registration data contained in the signature reference information.

When comparison values of respective pieces of data are similar within a specified standard or all data comparison values are similar within a specified standard, the server processor 260 determines that signature authentication succeeds, and provides the electronic device 100 with a signature-authenticated page screen. When signature authentication fails, the server processor 260 may provide the electronic device 100 with a message for reporting signature authentication failure.

Figure 4A:
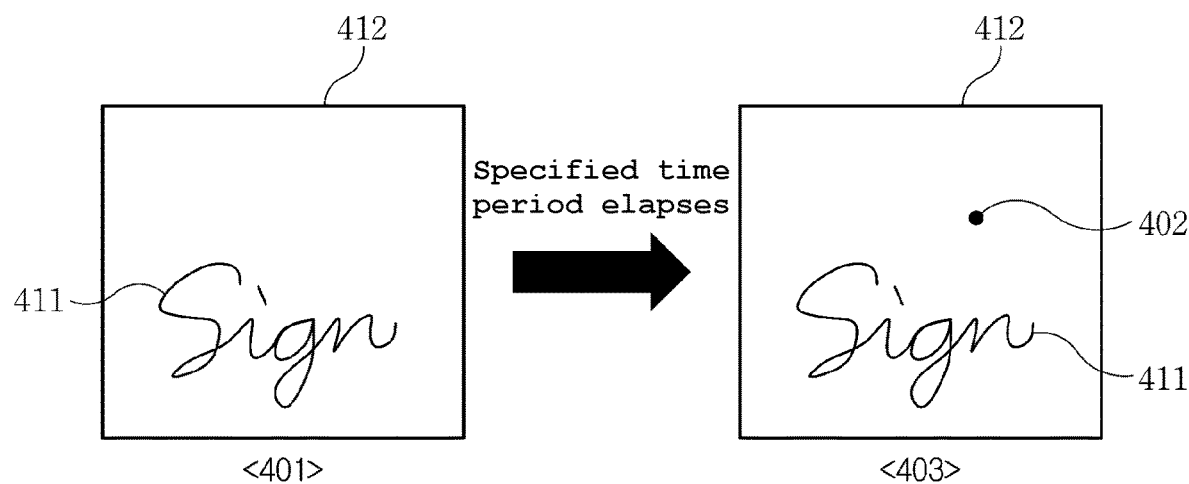
FIG. 4A is a diagram illustrating an example of a screen UI related to augmented handwritten signature authentication according to an embodiment of the present disclosure.

FIG. 4A is a diagram illustrating an example of a screen UI related to augmented handwritten signature authentication according to an embodiment of the present disclosure.

Referring to FIG. 4A, when a user function requiring signature authentication is executed, the processor 160 of the electronic device 100 outputs a screen for signature authentication to the display 150 and activates the touch panel 130 (or an electromagnetic induction panel related to electronic-pen authentication). As in Phase 401 shown in the figure, the user may enter a primary touch input 411 related to signature authentication with his or her finger or electronic pen. Regarding the primary touch input 411, the processor 160 of the electronic device 100 may set an area including the primary touch input 411 wholly, and may obtain the area as a primary touch input area 412 related to signature authentication. Regarding detection of the primary touch input area 412, the processor 160 may set a figure of a predetermined size (e.g., a quadrangle) including the primary touch input 411.

In the meantime, the processor 160 may wait for a specified time period after the primary touch input 411 is finished (e.g., the passage of a preset time period after the touch input). In this operation, the processor 160 may output notification of the passage of a specified time period. For example, the processor 160 may output numbers corresponding to a two-second count to the display 150. After the specified time period elapses, the processor 160 provides a screen state for a secondary touch input. For example, the processor 160 may output guidance information requesting the secondary touch input.

As in Phase 403, the user enters the secondary touch input 402, providing the input to a position overlapping with at least one of touch positions of the primary touch input 411. The secondary touch input 402 may correspond to a position defined in the signature reference information 141 that is pre-registered. When the secondary touch input 402 is received, the processor 160 determines whether the signature is valid, by comparing the signature reference information with primary touch input data corresponding to the primary touch input 411, secondary touch input data corresponding to the secondary touch input 402, and specified time period-elapsed information.

In addition, regarding signature authentication, the processor 160 may output, to the display 150, a virtual button for entering the secondary touch input immediately without the passage of a specified time period. For example, the processor 160 may output a virtual button related to signature authentication. Accordingly, the user selects the signature authentication virtual button to enter the primary touch input 411 and then selects the signature authentication virtual button again to immediately enter the secondary touch input 402. In this case, the processor 160 may obtain the primary touch input 411 and the secondary touch input 402 on the basis of the time points at which the signature authentication virtual button is pressed, and may then determine whether signature authentication succeeds, by comparing the primary touch input 411 and the secondary touch input 402 with the primary touch registration data and the secondary touch registration data prestored as the signature reference information.

In addition, the processor 160 may use the time period-elapsed information according to the passage of the specified time period as a criterion for obtaining the primary touch input data and the secondary touch input data. Next, the processor 160 may actually obtain the primary touch input data and the secondary touch input data, and may determine whether signature authentication succeeds, by comparing the primary touch input data and the secondary touch input data with the primary touch registration data and the secondary touch registration data stored as the signature reference information. In the meantime, it has been described that the processor 160 defines a particular figure including primary touch input 411, but the present disclosure is not limited thereto. For example, the processor 160 may define a closed curve provided as at least one line (e.g., a curve or a straight line) defining the minimum area corresponding to the primary touch input 411.

In the meantime, although FIG. 4A has been described in relation to signature authentication, the signature-related screen interface shown in FIG. 4A may be similarly used for signature registration. For example, the processor 160 may output a screen interface for signature input and may obtain primary touch input 411. After a specified time period elapses, the processor 160 may obtain secondary touch input 402 and store the inputs in the memory 140 as signature reference information.

As described above, in the augmented handwritten signature function of the present disclosure, a secondary mark (e.g., the secondary touch input 402) is input on the primary touch input 411, overlapping with the primary touch input 411, so that it is difficult to distinguish therebetween in appearance. In addition, even if others imitate the signature, it is difficult to imitate the secondary mark, thus providing relatively high security performance. In addition, after the primary signature is finished and a predetermined time period (for example, one second) elapses, the processor 160 distinguishes a secondary mark that is input to a point overlapping with the primary signature, so that it is relatively easy to determine whether the secondary mark is input.

Figure 4B:
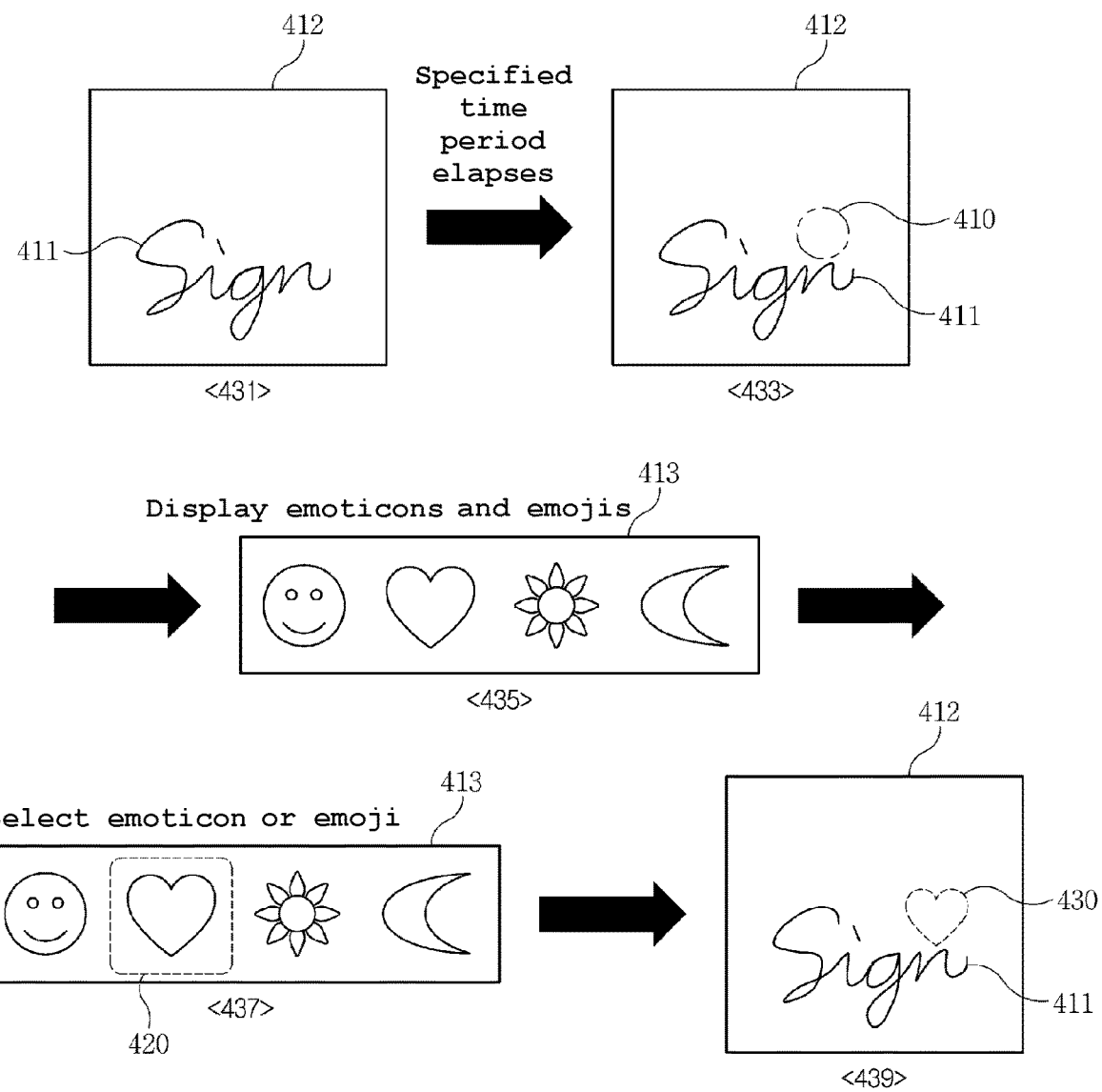
FIG. 4B is a diagram illustrating another example of a screen UI related to augmented handwritten signature authentication according to an embodiment of the present disclosure.

FIG. 4B is a diagram illustrating another example of a screen UI related to augmented handwritten signature authentication according to an embodiment of the present disclosure.

Referring to FIG. 4B, in relation to signature authentication, the processor 160 of the electronic device 100 may output a screen interface for signature input to the display 150. As in Phase 431, the user may enter a primary handwritten signature input to a screen interface related to signature input. The processor 160 may obtain a primary touch input 411 corresponding to the primary handwritten signature input. After the primary touch input 411, the processor 160 may define a primary touch input area 412 including the primary touch input 411.

After a specified time period elapses, the user may enter a touch input to a predetermined point 410 as in Phase 433. Alternatively, after selecting a menu for point selection, the user may enter the touch input to the predetermined point 410. Alternatively, the primary touch input 411 may be entered with an electronic pen, and the predetermined point 410 may be touched by a finger. The predetermined point 410 may be, for example, an area other than the primary touch input 411. Alternatively, the predetermined point 410 may be an area other than the primary touch input 411, but may be the area included in the primary touch input area 412. Regarding this, the processor 160 may output a boundary line indicating the primary touch input area 412 to the display 150.

When a touch input occurs at the predetermined point 410, the processor 160 outputs a category 413 including at least one item as in Phase 435. The category 413 may include, for example, special characters or at least one emoticon or emoji related to signature input.

As in Phase 437, the user may select at least one particular emoticon or emoji 420. Correspondingly, the processor 160 may obtain the particular emoticon or emoji 420 as a secondary mark input 430 as in Phase 439. The secondary mark input 430 may be, for example, an input corresponding to the above-described secondary touch input. The secondary mark input 430 may be displayed within the primary touch input area 412.

Herein, the processor 160 may output the determined secondary mark to a screen, but the determined secondary mark is not shown on the screen and is hidden. That is, the processor 160 outputs the determined secondary mark, being not shown on the screen and being hidden. Therefore, others are prevented from stealing the secondary data and security efficiency is thus maximized.

When information on the particular emoticon or emoji 420 corresponding to the secondary mark input 430 is obtained, the processor 160 compares the signature reference information with the primary touch position data corresponding to the primary touch input 411 and the information on the particular emoticon or emoji 420 corresponding to the secondary mark input 430. Regarding this, the signature reference information may contain primary touch registration data and emoticon/emoji registration information. The emoticon/emoji registration information may contain emoticon/emoji type information or emoticon/emoji display position information or both. When the secondary mark input 430 is obtained, the processor 160 determines whether signature authentication succeeds, by comparing the information prestored as the signature reference information with the type of the emoticon or emoji corresponding to the secondary mark input 430, or with the position at which the emoticon or emoji is displayed, or with both.

As described above, after a handwritten signature (e.g., a primary handwritten signature) is input, when an area other than the handwritten signature is touched, the processor 160 of the electronic device 100 according to the embodiment of the present disclosure displays a plurality of emoticons and emojis on the screen, and obtains the emoticon or emoji selected by the user as a secondary mark input to use the emoticon or emoji for signature authentication. In this case, the secondary mark is displayed being not shown on the screen and being hidden, so that others are unable to recognize the secondary mark, thus improving security performance. The emoticon/emoji selection may be registered together when a handwritten signature is registered. In addition, the electronic device 100 of the present disclosure may provide various settings other than emoticons and emojis as secondary mark inputs (or inputs related to a secondary handwritten signature).

Figure 5:
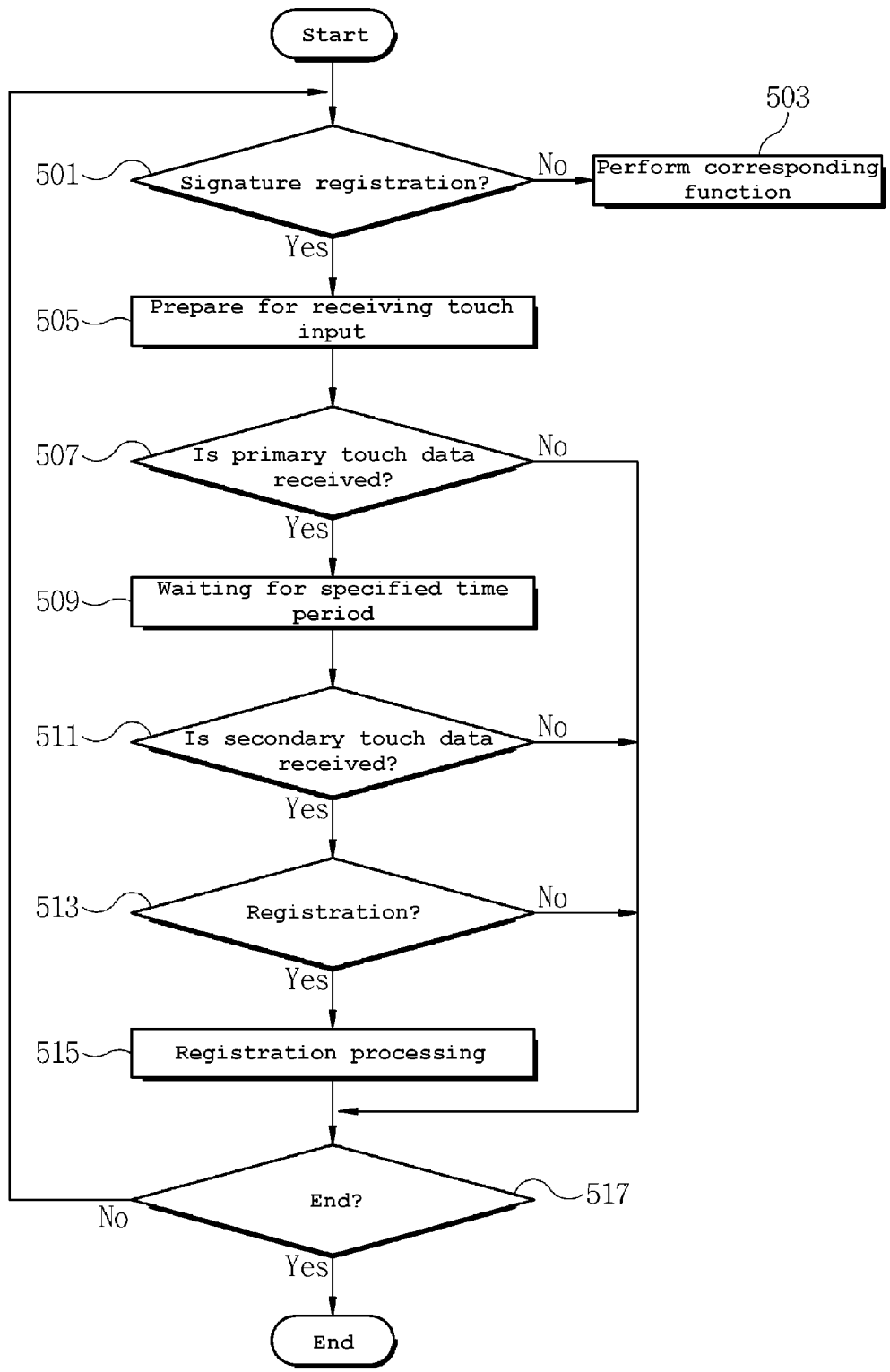
FIG. 5 is a diagram illustrating an example of a method related to signature registration, in an augmented handwritten signature authentication method according to an embodiment of the present disclosure.

FIG. 5 is a diagram illustrating an example of a method related to signature registration, in an augmented handwritten signature authentication method according to an embodiment of the present disclosure.

Referring to FIG. 5, in relation to the signature registration method related to augmented handwritten signature authentication according to the embodiment of the present disclosure, the processor 160 of the electronic device 100 may determine whether an event related to signature registration occurs at step 501. Alternatively, when an event occurs, the processor 160 determines whether the event is an event related to signature registration. When the event is not an event related to signature registration, the processor 160 performs a function according to the type of the event at step 503. For example, when the event is an event requesting access to a particular web server, the processor 160 accesses the web server related to the event and receives and outputs the content that the web server provides. Alternatively, according to types of events, the processor 160 may control the execution of a particular function provided by the electronic device 100, for example, a music play function, a call function, or a gallery function.

When the occurred event is an event related to electronic signature registration, the processor 160 prepares for receiving a touch input at step 505. Regarding this, the processor 160 may activate the touch panel 130 (or an electromagnetic induction panel related to electronic-pen authentication).

Next, the processor 160 may determine whether primary touch data is received at step 507. When the primary touch data is received, the processor 160 waits for a specified time period at step 509. During this time period, the processor 160 may output a message for reporting waiting for receiving secondary touch data, to the display 150 or through the Input/output unit 110. Alternatively, the processor 160 may provide a screen interface so that the user is able to specify the specified time period. The specified time period may be a time period (e.g., several seconds) previously specified by the user, or a time period determined as a default by a program related to an augmented handwritten signature function. During the passage of the specified time period, the processor 160 may perform control to deactivate a secondary touch input.

When the specified time period elapses, the processor 160 determines whether secondary touch data is received at step 511. When the secondary touch data is received, the processor 160 may determine whether registration is made, at step 513. Regarding this, the processor 160 may display the previously obtained primary touch data, information on a specified time period that elapses without collection of touch data, and the secondary touch data on the display 150, and may output a pop-up window or menu asking whether to register the signature reference information 141 based on the pieces of the information.

When a user input requesting registration is received, the processor 160 may perform registration processing based on the collected pieces of the information, at step 515. For example, the processor 160 may store the collected pieces of the information in the secure memory area of the electronic device 100. Herein, the stored information may contain, for example, the primary touch data, the information on the waiting time, and the secondary touch data input after the waiting time. The secondary touch data may at least overlap with the primary touch data. Accordingly, when the position of the secondary touch data at least overlaps with the position of the primary touch data, the processor 160 outputs a pop-up window asking whether to make registration at step 513. When the position of the secondary touch data is different from the position of the primary touch position data, the processor 160 automatically outputs a pop-up window or a report message requesting re-input of the secondary touch data.

After the registration processing, the processor 160 may determine whether a termination event related to signature registration occurs. For example, the processor 160 may determine whether there is a user input selecting a menu, an item, or a finish button for requesting signature registration termination, or whether a specified time period elapses after the registration processing. When an event related to signature registration termination does not occur and an event for signature re-registration occurs, the processor 160 performs control to proceed back to step 501 and perform the following operations again.

At each of the steps 507, 511, and 513, when an event corresponding to non-reception of touch data or refusal or registration occurs within a specified time period, proceeding to step 517 takes place and the processor 160 performs the following operations again.

Figure 6:
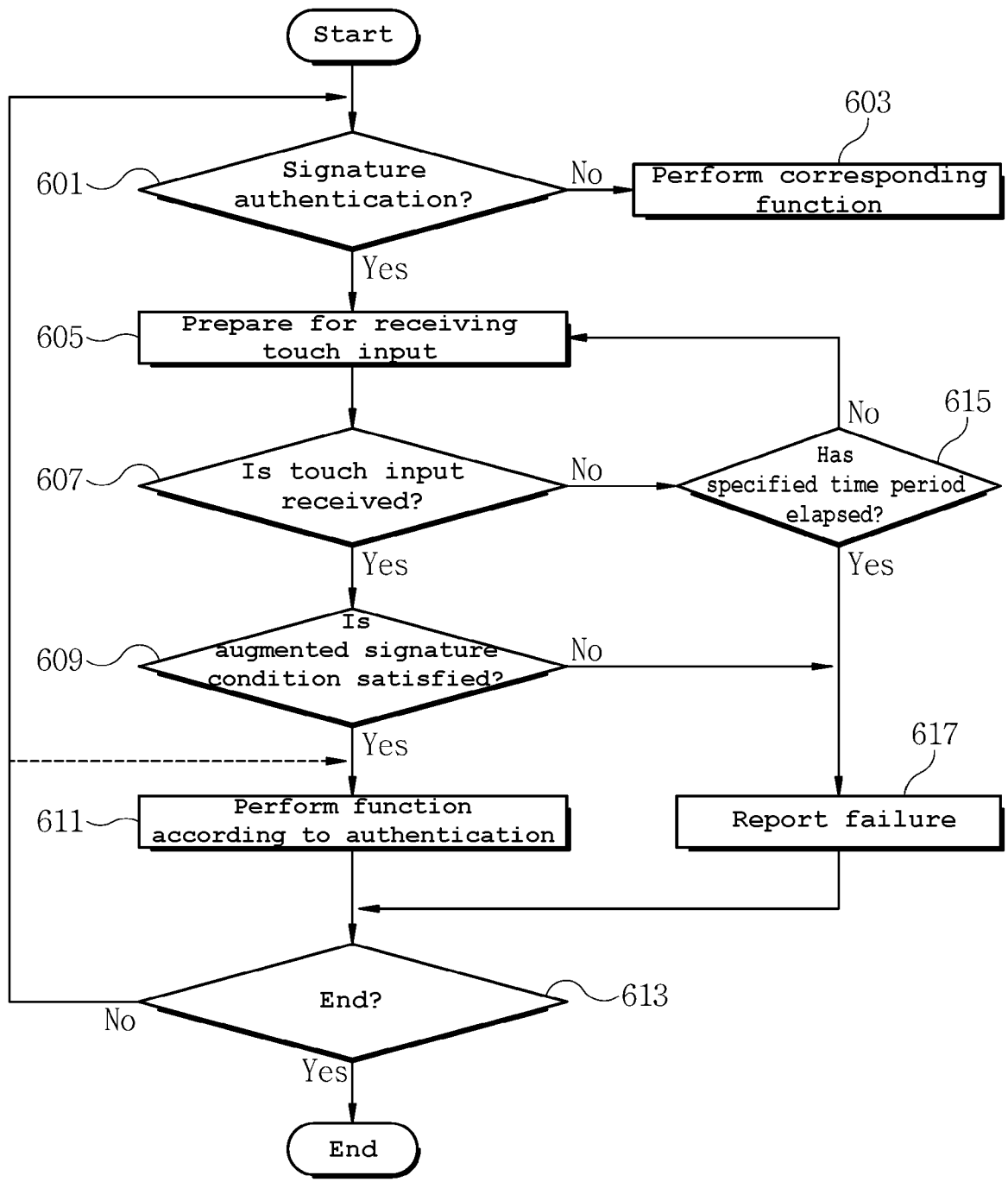
FIG. 6 is a diagram illustrating an example of a method related to signature authentication, in an augmented handwritten signature authentication method according to an embodiment of the present disclosure.

FIG. 6 is a diagram illustrating an example of a method related to signature authentication, in an augmented handwritten signature authentication method according to an embodiment of the present disclosure.

Referring to FIG. 6, regarding signature authentication in the augmented handwritten signature authentication method, the processor 160 of the electronic device 100 may determine whether an event requesting signature authentication occurs at step 601. For example, the processor 160 may determine whether the execution of an application program related to signature authentication is requested or whether a web site requiring signature authentication is accessed. When the event is an event not related to the request for signature authentication, the processor 160 performs a function according to the type of the event at step 603. For example, according to types of events, the processor 160 may perform a signature registration function, execute a music play function, or support the execution of a web browser.

When the event related to signature authentication is received, the processor 160 prepares for receiving a touch input at step 605. For example, the processor 160 may activate the touch panel 130 (or an electromagnetic induction panel) to receive the user signature. Next, the processor 160 may determine whether the touch input is received at step 607.

When the touch input is received within a specified time period, the processor 160 determines whether the received touch input information satisfies an augmented signature condition at step 609. Describing this in more detail, the processor 160 may determine whether secondary touch data is obtained after the primary touch data is obtained and the specified time period elapses. The processor 160 may compare the touch input information primary touch input data, elapsed time information, and secondary touch input data with the signature reference information 141 prestored in the memory 140.

When the prestored signature reference information 141 and the touch input information match within a specified error range, the processor 160 determines that the augmented signature condition is satisfied. In this process, the processor 160 may determine whether the touch positions of the primary touch input data are the same as the touch positions of the secondary touch input data. When the touch positions are the same, it is determined that the touch input information is valid information. Alternatively, the processor 160 may determine whether the secondary touch input data corresponds to prestored screen interface manipulation information of the electronic device 100. The screen interface manipulation information may contain, for example, information on selection of a menu, an item, or an emoticon/emoji provided in a touch input environment. The primary touch registration data in the prestored signature reference information 141 includes a predetermined touch range, and when touch manipulation information corresponding to the secondary touch input data is within the predetermined touch range, the processor 160 determines that the touch manipulation information is valid information. When the touch manipulation information is out of the predetermined touch range, the processor 160 determines that the touch manipulation information is invalid information.

At step 613, the processor 160 may determine whether an event requesting termination of the function related to signature authentication is input. For example, the processor 160 may determine whether a user input commanding signature authentication termination occurs or whether a specified time period elapses. When the event related to termination of the function does not occur, proceeding back to step 601 takes place and the processor 160 performs the following operations again.

In the meantime, when the augmented signature condition is satisfied, the processor 160 performs a function according to authentication at step 611. For example, the processor 160 may perform a particular function (e.g., a gallery function, an e-mail function, and a particular site access function) that has requested the augmented signature condition, and may output a screen according to the execution of the function to the display 150.

When there is no touch input at step 607, the processor 160 determines whether a specified time period elapses at step 615. When the specified time period elapses, the processor 160 reports that the execution of the function related to signature authentication fails, at step 617. When the specified time period does not elapse, returning back to step 605 takes place and the processor 160 performs the following operations again.

In addition, when the augmented signature condition is not satisfied at step 609, the processor 160 reports that authentication related to the augmented signature fails, at step 617.

As described above, the augmented handwritten signature authentication method according to the embodiment of the present disclosure may include: receiving a primary handwritten signature input (e.g., the primary touch input data) of a user; obtaining primary touch position data from the primary handwritten signature input; after the primary handwritten signature input is received and a predetermined time period elapses, receiving a secondary touch input (e.g., the secondary touch input data) of the user; obtaining secondary touch position data from the secondary touch input; and performing user authentication by comparing the primary touch position data and the secondary touch position data with pre-registered primary touch position data (e.g., the primary touch registration data) and pre-registered secondary touch position data (e.g., the secondary touch registration data), respectively.

The augmented handwritten signature authentication method may further include: performing comparison to determine whether the secondary touch position data overlaps with part of the primary touch position data; and determining the secondary touch position data as valid data when the secondary touch position data overlaps with the part of the primary touch position data, or determining the secondary touch position data as invalid data when the secondary touch position data does not overlap with the part of the primary touch position data.

Alternatively, the augmented handwritten signature method may further include: receiving a touch input to an area other than the primary handwritten signature after receiving the primary handwritten signature input; displaying a plurality of emoticons and emojis on a screen; receiving a user input of selecting one of the emoticons and emojis; and determining the selected emoticon or emoji as the secondary mark input.

Meanwhile, the embodiments disclosed in the present disclosure and the drawings are particular examples to help understanding, and are not intended to limit the scope of the present disclosure. It is clear to a person skilled in the art to which the present disclosure pertains that other modified examples based on the technical idea of the present disclosure can be implemented.

DESCRIPTION OF THE REFERENCE NUMERALS IN THE DRAWINGS

10: Augmented handwritten signature authentication system
50: Network
100: Electronic device
110: Input/output unit
120: Communication circuit
130: Touch panel
140: Memory
150: Display
160: Processor
161: Data acquisition unit
163: Signature authentication unit
163a: Scaling unit
163b: Comparison unit
200: Server device
210: Server communication circuit
240: Server memory
260: Server processor

The invention claimed is:

1. An augmented handwritten signature authentication method, comprising:
receiving a primary touch input corresponding to a primary handwritten signature input of a user;
receiving, after the primary handwritten signature input is received and a specified time period elapses, a secondary mark input of the user;
obtaining primary touch position data corresponding to the primary touch input, and the secondary mark input;
performing user authentication by comparing the primary touch position data corresponding to the primary touch input and secondary touch position data related to at least part of the secondary mark input with prestored primary touch registration data and secondary touch registration data, respectively;
performing comparison to determine whether the secondary touch position data overlaps with part of the primary touch position data; and
determining the secondary touch position data as valid data when at least part of the secondary touch position data overlaps with the at least part of the primary touch position data, or determining the secondary touch position data as invalid data when the at least part of the secondary touch position data does not overlap with the at least part of the primary touch position data.

2. The augmented handwritten signature authentication method of claim 1, wherein the obtaining of the secondary mark input comprises:
receiving a touch input to an area other than a position of the primary handwritten signature input;
displaying a plurality of emoticons and emojis on a screen;
receiving a user input of selecting one of the emoticons and emojis; and
determining the selected emoticon or emoji as the secondary mark input.

3. The augmented handwritten signature authentication method of claim 2, wherein at the determining as the secondary mark input, the determined secondary mark is output to the screen, being not shown on the screen and being hidden.

4. An electronic device supporting augmented handwritten signature authentication, the electronic device comprising:
a data acquisition unit configured to obtain a primary touch input corresponding to a primary handwritten signature input of a user, and obtain, after a specified time period elapses, a secondary mark input; and
a signature authentication unit configured to obtain primary touch position data corresponding to the primary touch input, and the secondary mark input, and perform user authentication by comparing the primary touch position data corresponding to the primary touch input and secondary touch position data related to at least part of the secondary mark input with prestored primary touch registration data and secondary touch registration data, respectively,
wherein the signature authentication unit is configured to perform comparison to determine whether the secondary touch position data overlaps with part of the primary touch position data, and
determine the secondary touch position data as valid data when at least part of the secondary touch position data overlaps with the at least part of the primary touch position data, or determine the secondary touch position data as invalid data when the at least part of the secondary touch position data does not overlap with the at least part of the primary touch position data.

5. The electronic device of claim 4, wherein the data acquisition unit is configured to receive a touch input to an area other than a position of the primary handwritten signature input, display a plurality of emoticons and emojis on a screen, receive a user input of selecting one of the emoticons and emojis, and determine the selected emoticon or emoji as the secondary mark input.

6. The electronic device of claim 5, wherein the data acquisition unit is configured to output the determined secondary mark to the screen, the determined secondary mark being not shown on the screen and being hidden.

* * * * *